(12) United States Patent
Weippert

(10) Patent No.: US 7,285,231 B2
(45) Date of Patent: Oct. 23, 2007

(54) IMMERSION LIQUID FOR WATER-IMMERSION MICROSCOPY

(75) Inventor: Hans-Joachim Weippert, Aalen (DE)

(73) Assignee: Carl-Zeiss-Stiftung trading as Carl Zeiss, Heidenheim (DE)

( * ) Notice: Subject to any disclaimer, the term of this patent is extended or adjusted under 35 U.S.C. 154(b) by 4 days.

(21) Appl. No.: 10/785,772

(22) Filed: Feb. 23, 2004

(65) Prior Publication Data

US 2004/0220070 A1  Nov. 4, 2004

(30) Foreign Application Priority Data

Feb. 27, 2003  (DE) ............... 103 08 610

(51) Int. Cl.
*G01N 33/483* (2006.01)
*C09K 3/00* (2006.01)
*G02B 3/12* (2006.01)
*C11D 17/00* (2006.01)

(52) U.S. Cl. .............. 252/408.1; 252/1; 359/665; 510/411; 510/413; 510/417

(58) Field of Classification Search ............ 252/408.1
See application file for complete search history.

(56) References Cited

U.S. PATENT DOCUMENTS

| 3,979,301 | A | * | 9/1976 | Ushioda et al. .......... 252/408.1 |
| 4,108,794 | A | * | 8/1978 | Yonekubo ................ 252/408.1 |
| 4,493,533 | A | * | 1/1985 | Petrzilka et al. ......... 252/408.1 |
| 4,587,042 | A | * | 5/1986 | Liva .......................... 252/582 |
| 6,152,876 | A | * | 11/2000 | Robinson et al. ........... 600/322 |
| 6,221,281 | B1 | * | 4/2001 | Motoyama ............... 252/408.1 |
| 2002/0163629 | A1 | | 11/2002 | Switkes et al. |
| 2004/0004757 | A1 | | 1/2004 | Schuster |
| 2004/0004858 | A1 | | 1/2004 | Kondo |

FOREIGN PATENT DOCUMENTS

DE  197 05 978 A1  9/1997
DE  197 37 501 A1  3/1999
DE  101 23 027     11/2002
DE  102 10 899 A1  9/2003

OTHER PUBLICATIONS

Giannetti, Enzo, "PerFluoroPolyEthers," 12 pages, obtained from internet on Mar. 30, 2006 at: http://www.sematech.org/resources/litho/meetings/forum/20040128/posters/157_Giannetti_Solvay%20Solexis.pdf.*
"Fluorochemical Lubricating Oils and Greases," (2000, Daikin Industries, Ltd.), obtained from the internet Sep. 21, 2005 at: http://www.daikin.co.jp/chm/en/pro/kasei/dmnm_01.html.*
Mehra, Rita "Application of refractive index mixing rules . . . ," Proc. Indian Acad. Sci. (Chem. Sci.), vol. 115, No. 2, Apr. 2003, pp. 147-154.*
Switkes et al. "Immersion lithography at 157 nm," J. Vac. Sci. Technol. B 19(6), Nov./Dec. 2001.*
Sianesi et al., "Perfluoropolyethers (PFPEs) from Perfluoroolefin Photooxidation," in "Organofluorine Chemistry: Principles and Commercial Appplications," (editd by R.E. Banks et al.), Plenum Press (New York, 1964).*
"Fomblin PFPE: Vacuum Pump Oils, Product Data Sheet," (modified Dec. 13, 2002), obtained from www.solvaysolexis.com.*
"Fomblin Z Derivatives, Product Data Sheet," (modified Dec. 13, 2002), obtained from www.solvaysolexis.com.*
"DuPont™ Fluoroguard® polymer additive, General Overview," (Feb. 2001) Reorder No. H-86060-4.*
Cargille, John J., "Immersion Oil and the Microscope," (New York Microscopical Society Yearbook, 1964) obtained from the internet Mar. 29, 2006 at: http://www.cargille.com/immersionoilmicroscope.shtml.*

* cited by examiner

*Primary Examiner*—Joseph D. Anthony
(74) *Attorney, Agent, or Firm*—Harnes, Dickey & Pierce, P.L.C.

(57) ABSTRACT

An immersion liquid for microscopy using water immersion objectives has a refractive index in the range from 1.25 to 1.4 and a kinematic viscosity of greater than 20 mm$^2$/s at 20° C.

14 Claims, No Drawings

IMMERSION LIQUID FOR WATER-IMMERSION MICROSCOPY

BACKGROUND OF THE INVENTION

The method of immersion is used for increasing the numerical aperture, and consequently the resolving power, of microscope objectives. In the case of immersion objectives, a viscous liquid (immersion oil) whose refractive index and dispersion match the optical properties of the front lens of the objective is added between the preparation and the objective.

The properties of immersion oils are defined in the standards DIN 58.884 or ISO 8036/1+2. The refractive index of immersion oils which comply with this standard is $n_e=1.5180\pm0.0004$ at 23° C.

Such immersion oils are described in DE 197 05 978 A1 and DE 197 37 501 A1.

These immersion liquids are introduced between the microscope objective and the sample to be observed in order to increase the resolution of the microscopes. The chemical substances which are used for achieving these high refractive indices, for example chlorinated paraffins, are highly toxic and are, in particular, unsuitable for investigating live biological samples. For this reason, water, which, while only having a refractive index of 1.3339 (at 23° C.) is, on the other hand, biologically tolerated and also possesses very good optical properties (no self fluorescence, high transmission), is generally used for investigating such samples. In order to achieve optimal imaging quality, the microscope objectives have to be matched precisely to the refractive index of the immersion liquid employed, which means that an oil objective cannot be used with water immersion and vice versa. However, when used as an immersion liquid, water suffers from the disadvantage that evaporation occurs, especially in connection with long-term investigations as are increasingly employed in modern biology, with this evaporation then cancelling out the effect of the immersion liquid.

In order to eliminate this problem, DE-OS 101 23 027 proposes a device for automatically supplying immersion liquid. This device has a complicated construction and also suffers from the disadvantage that parts extend into the sample space and thereby impede manipulation of the sample.

The object of the present invention is therefore to design an immersion medium which makes it possible to carry out long-term investigations and which possesses the optical properties of water.

SUMMARY OF THE INVENTION

According to the invention, the object is achieved by means of an immersion liquid which has a refractive index in the range from 1.25 to 1.4 and has a kinematic viscosity of greater than 20 mm²/s at 20° C.

Such an immersion liquid has a refractive index which is close, or corresponds, to the refractive index of water.

Because of an increase in the kinematic viscosity to a value of greater than 20 mm²/s, with the viscosity of water by comparison being about 1 mm²/s, a medium possessing an oily character is prepared, with this contributing to the maintenance of the liquid film between the microscope and the sample carrier and with the medium not exhibiting the tendency shown by water to evaporate, accordingly making it possible to carry out long-term investigations without difficulty.

This immersion liquid combines the positive optical properties of water and the positive properties of oils with regard to low evaporizability, thereby creating immersion liquids which are optimized for this purpose.

In other embodiments of the invention, the immersion liquid has a kinematic viscosity of greater than 50 mm²/s, in particular greater than 150 mm²/s.

In these ranges, the oily character increases markedly without completely abandoning the positive optical properties of water.

Particularly favourable immersion liquids can be prepared in a kinematic viscosity range of from 20 mm²/s to 1500 mm²/s. Depending on the requirements, for example with regard to the duration of the long-term investigations or with regard to the preparation technique, a more oily character may be required, with the range of the kinematic viscosity particularly advantageously being from 200 mm²/s to 800 mm²/s.

A particularly advantageous embodiment of the invention consists in precisely matching the refractive index of the immersion liquid to the refractive index of water.

This step has the advantage that it is then possible to use the immersion liquid according to the invention without difficulty in the case of microscopes whose objectives were calculated for water, as the previously employed immersion medium, without carrying out any recalculations, while, at the same time, the disadvantageous property of the ready evaporation of water is eliminated by using low-volatility substances.

Particularly advantageously, the immersion liquid exhibits the refractive index of water at elevated temperatures, in particular at 37° C., because it is then possible to carry out investigations on living cells without having to perform any recalculations.

In another advantageous embodiment, the immersion liquid exhibits high transmission, in particular a transmission of more than 70% at a layer thickness of d=10 mm or of more than 96% at a layer thickness of d=1 mm at wavelengths of greater than 350 nm.

This particularly interesting wavelength range makes possible a high transmission which approaches the transmission behaviour of water, in particular in the region of wavelength ranges of greater than 400 nm.

In another embodiment of the invention, the vapour pressure of the immersion liquid at 20° C. is less than a value of 0.01 kPa. The vapour pressure of water at 20° C. is 2.34 kPa.

In another embodiment of the invention, the vapour pressure at 20° C. is less than 0.001 kPa.

Immersion liquids having such low vapour pressure values do not exhibit any tendency to evaporate and consequently do not tend to dry out as does water.

Immersion oils with the abovementioned stipulations can particularly advantageously contain at least one functional perfluoropolyether. Pure perfluoropolyethers are less well suited for use as basic components for immersion oils possessing a water-like refractive index since they typically have refractive indices of from $n_D=1.29$ to 1.31 at 20° C. Fluorosilicone oils ($n_D$=from 1.38 to 1.39 at 20° C.) and fluorocarbon compounds ($n_D \leq 1.29$ at 20° C., high volatility) are not particularly well suited, either. Perfluoropolyethers can be differentiated into straight-chain, branched-chain and mixed-chain compounds.

Functional perfluoropolyethers can be monofunctional or di-functional. The following groups can be used as functional groups: alcohol, polyglycol (possessing ethylene glycol and/or propylene glycol structures), alkyl, alkyl alcohol, alkyl ole-fin, alkyl ester, alkyl methacrylate, methyl ester, acetyl ester, alkylamide, alkyl sulphate, alkyl phosphate, alkyl carboxylate, isocyanate and derivatives, and functional silanes.

Functional perfluoropolyethers are produced and marketed by, for example, the company Solvay Solexis under the protected brand name Fluorolink or by the company Du Pont under the protected brand name Zonyl.

Perfluoropolyethers are not particularly volatile, nontoxic, to a large extent chemically inert and very stable towards ageing.

It is possible to use common solvents, such as acetone or isopropanol, to clean the immersion liquid according to the invention from the objectives, or else it is possible to initially use fluorinated solvents for the preliminary cleaning and then to use nonpolar solvents, such as petroleum ether, hexane or cyclohexane, for the subsequent cleaning.

As described above, functional perfluoropolyethers are available on the market in a large number of chemical configurations and can be readily adapted, by means of additional modifycations, to the particular microscopy circumstances. If the functional perfluoropolyethers possess terminal alcohol groups, it is possible for alcohol-soluble microscopy dyes to begin to dissolve. If this property is troublesome, for example in the case of an open preparation (without cover slip), the terminal hydroxyl groups can be saturated, for example by means of acetylation, such that it is possible to achieve a completely dye-inert behaviour without other optical properties being significantly altered in this connection.

If the fluorescence or transmission values of the raw materials employed are still not satisfactory, as a result of the way the materials have been prepared, it is then possible to improve these fluorescence or transmission values by means of a subsequent purification, for example using active charcoal, without other optical properties being altered disadvantageously. This is due, in particular, to what is the essentially chemically inert behaviour of these perfluoropolyethers.

It is particularly advantageous to use perfluoropolyethers of the general form (I)

$$R_1-CF_2O-(CF_2-CF_2-O)_p-(CF_2O)_q-CF_2-R_2 \quad (I)$$

where $R_1$ and $R_2$ in each case represent the following $R_3O-CH_2-$, where $R_3$=H or alkyl having from 1 to 3 carbon atoms $R_4-COO-$, where $R_4$=alkyl having from 1 to 3 carbon atoms $R_5-O-CH_2CH(OH)-CH_2-O-CH_2-$, where $R_5$=H or alkyl having from 1 to 3 carbon atoms or $R_4-CO-$, $R_3-O-(CH_2CH_2O)_n-CH_2-$, where n is in the range from 1 to 3, and p and q are in each case in the range from 3 to 12.

This group of substances makes it possible to prepare a wide range of immersion liquids which conform to the previously mentioned parameters. By mixing individual substances, it is possible, in each case, to influence the desired properties selectively or to fulfil quite specific requirements, with this being within the scope of the technical activity and experimentation of the skilled person.

Thus, it is possible, in particular, to selectively prepare immersion liquids which have the precise refractive index of water ($n_e$ (546.1 nm)=1.3339 at 23° C.).

Depending on the application temperature, it is possible, for example for observing living cells at 37° C., to admix functional perfluoropolyethers of higher viscosity in order to increase the viscosity to match the working temperature.

The choice of perfluoropolyethers relates only to one group of substances. It lies within the scope of expert experimentation, under the restrictions which are specified in accordance with the invention, to use other substance groups, or additional substances in a mixture with the perfluoropolyethers, in order to achieve the same goal.

In addition, it is possible to add substances, to the immersion liquids, which have little influence on the refractive index and/or the viscosity but are desirable for other reasons. If perfluoropolyethers form the basis, they are then present as the dominant constituent, for example 90% or more.

For this reason, the invention relates not only to the substances which are mentioned above and to those which are mentioned below, or to the combinations which have been mentioned, but also to other combinations which lie within the scope of the invention.

The invention is explained in more detail below with the aid of a few selected exemplary embodiments.

DETAILED DESCRIPTION OF PREFERRED EMBODIMENTS

Selected Perfluoropolyethers

TABLE 1

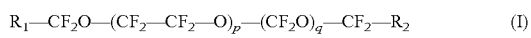

(1)

| Properties | 1a | 1b |
|---|---|---|
| Functional groups | alcohol | alcohol |
| Mean molecular weight | 2000 | 1300 |
| Surface tension at 20° C. | 24 dyn/cm | 24 dyn/cm |
| Bifunctional content | 94% (NMR) | 94% |
| Fluorine content | 61% | 60% |
| Kinematic viscosity at 20° C. | 85 mm²/s | 95 mm²/s |
| Refractive index nD20 | 1.30 | 1.30 |
| Vapour pressure at 20° C. | $2 \times 10^{-5}$ | $2 \times 10^{-4}$ |
| (torr) at 100° C. | $2 \times 10^{-3}$ | $2 \times 10^{-2}$ |
| Specific density at 20° C. | 1.80 g/cm³ | 1.77 g/cm³ |
| Appearance | clear | clear |
| Water content | <500 ppm | <500 ppm |
| p, q | ~10.0 | ~6.2 |

These perfluoropolyethers can be obtained, under the protected brand names FLUOROLINK D10-H and FLUOROLINK D10 (perfluoropolyether macromers having —CH₂OH terminal functional groups), from the company Solvay Solexis.

TABLE 2

(2)

$HO(CH_2-CH_2O)_n-CH_2CF_2O-(CF_2CF_2O)_p-(CF_2O)_q-CF_2-CH_2(OCH_2CH_2)_nOH$

| Properties | 2a | 2b |
|---|---|---|
| Functional groups | alcohol | alcohol |
| Mean molecular weight | 2200 (NMR) | 1500 (NMR) |
| Surface tension at 20° C. | 23 dyn/cm | 23 dyn/cm |
| Bifunctional content | 94% | 94% |
| Fluorine content | 57% | 56% |
| Kinematic viscosity at 20° C. | 145 mm²/s | 110 mm²/s |
| Refractive index nD20 | 1.32 | 1.33 |
| Specific density at 20° C. | 1.73 g/cm³ | 1.69 g/cm³ |
| Appearance | clear | clear |
| Average value of n | 1.5 | 1.5 |
| p, q | ~10.4 | ~6.6 |

These perfluoropolyethers can be obtained, under the protected brand names FLUOROLINK E and FLUOROLINK E10 (perfluoropolyether macromers having —CH$_2$(OCH$_2$CH$_2$)$_n$ OH terminal functional groups), from the company Solvay Solexis.

TABLE 3

$$CH_3COO\text{—}CF_2O\text{—}(CF_2CF_2O)_p\text{—}(CF_2O)_q\text{—}CF_2\text{—}COOCH_3 \quad (3)$$

| Properties | 3a | 3b |
|---|---|---|
| Functional groups | methyl ester | methyl ester |
| Mean molecular weight | 2000 | 1300 |
| Bifunctional content | 94% | 94% |
| Fluorine content | 59% | 58% |
| Kinematic viscosity at 20° C. | 20 mm²/s | 10 mm²/s |
| Refractive index nD20 | 1.30 | 1.31 |
| Vapour pressure at 20° C. (torr) at 100° C. | 3 × 10⁻⁴<br>2 × 10⁻³ | 6 × 10⁻⁴<br>2 × 10⁻¹ |
| Specific density at 20° C. | 1.80 g/cm³ | 1.65 g/cm³ |
| Appearance | clear | clear |

These perfluoropolyethers can be obtained, under the protected brand names FLUOROLINK L and FLUOROLINK L10 (perfluoropolyether macromers having —C(O)(OCH$_3$ terminal functional groups), from the company Solvay Solexis.

TABLE 4

$$HOCH_2CH(OH)CH_2OCH_2\text{—}CF_2O\text{—}(CF_2CF_2O)_p\text{—}(CF_2O)_q\text{—}CF_2\text{—}CH_2OCH_2CH(OH)CH_2OH \quad (4)$$

| Properties | 4a | 4b |
|---|---|---|
| Functional groups | alcohol | alcohol |
| Mean molecular weight | 2200 | 1500 |
| Mean functionality | 3.9 | 3.9 |
| Fluorine content | 57% | 55% |

TABLE 4-continued $$HOCH_2CH(OH)CH_2OCH_2\text{—}CF_2O\text{—}(CF_2CF_2O)_p\text{—}(CF_2O)_q\text{—}CF_2\text{—}CH_2OCH_2CH(OH)CH_2OH \quad (4)$$

| Properties | 4a | 4b |
|---|---|---|
| Refractive index nD20 | 1.32 | 1.33 |
| Kinematic viscosity at 20° C. | 1800 mm²/s | 1500 mm²/s |
| Specific density at 20° C. | 1.75 g/cm³ | 1.70 g/cm³ |
| Appearance | clear | clear |
| Water content | <300 ppm | <300 ppm |

These perfluoropolyethers can be obtained, under the protected brand names FLUOROLINK T and FLUOROLINK T10 (perfluoropolyether macromers having —CH$_2$OCH$_2$CH(OH)CH$_2$OH terminal functional groups), from the company Solvay Solexis.

By mixing the abovementioned polyfluoropolyethers, it is possible to prepare an immersion liquid which has the precise refractive index of water, namely 1.3339 at 23° C., and a kinematic viscosity at 20° C. of approx. 300-600 mm²/s.

The experimental specimens V1 to V3 were obtained by mixing the abovementioned perfluoropolyethers as indicated in Table 5 below.

TABLE 5

| | Mixture compositions | | |
|---|---|---|---|
| Experiment specimen | 1b | 4b | 2b |
| V1 | 3% | — | 97% |
| V2 | 6% | 56% | 38% |
| V3 | 1% | 87% | 12% |

In Table 6 below, the properties of the three immersion liquids, designated Immersol W, are compared with the corresponding properties of water.

TABLE 6

| Parameter | IMMERSOL W (V1) for 23° C. | IMMERSOL W (V2) for 23° C. | IMMERSOL W (V3) for 37° C. | Water |
|---|---|---|---|---|
| Refractive index at 23° C. | | | | |
| e (546.1 nm) | 1.3339 | 1.3339 | 1.3365 | 1.3339 |
| D (589.3 nm) | 1.3329 | 1.3329 | 1.3352 | 1.3321 |
| F' (480.0 nm) | 1.3359 | 1.3360 | 1.3389 | 1.3368 |
| C' (643.8 nm) | 1.3314 | 1.3314 | 1.3341 | 1.3304 |
| dispersion v$_e$ | 74.2 | 72.6 | 70.1 | 52.2 |
| Refractive index at 37° C. | | | | |
| e (546.1 nm) | 1.3289 | 1.3291 | 1.3320 | 1.3320 |
| D (589.3 nm) | 1.3279 | 1.3281 | 1.3309 | 1.3302 |
| F' (480.0 nm) | 1.3309 | 1.3315 | 1.3344 | 1.3349 |
| C' (643.8 nm) | 1.3264 | 1.3269 | 1.3296 | 1.3285 |
| dispersion v$_e$ | 73.1 | 71.5 | 69.2 | 51.9 |
| Temperature coefficient | | | | |
| Δn (∂) in the range 20/40° C. | −0.00036/° C. | −0.00034/° C. | −0.00032/° C. | −0.00014°C. |
| Residual fluorescence [mg/l, quinine sulphate] | | | | |
| F (365 nm/450 nm) | 0.13 | 0.11 | 0.11 | 0.0010 |
| F (405 nm/485 nm) | 2.90 | 0.47 | 0.47 | 0.040 |

TABLE 6-continued

| Parameter | IMMERSOL W (V1) for 23° C. | IMMERSOL W (V2) for 23° C. | IMMERSOL W (V3) for 37° C. | Water |
|---|---|---|---|---|
| Transmission (d = 10 mm) | | | | |
| 500-850 nm | >99.5% | >99.5% | >99.5% | >99.8% |
| 450 nm | 99.3% | 99.1% | 99.5% | >99.8% |
| 420 nm | 97.9% | 98.2% | 99.5% | >99.8% |
| 400 nm | 94.4% | 97.1% | 99.3% | >99.8% |
| 380 nm | 94.3% | 95.3% | 98.2% | >99.8% |
| 365 nm | 77.8% | 93.3% | 96.2% | >99.8% |
| 350 nm | 79.3% | 89.9% | 93.3% | >99.8% |
| 330 nm | 70.6% | 81.1% | 85.3% | >99.8% |
| 310 nm | 54.2% | 66.3% | 71.1% | >99.8% |
| Viscosity at 20° C. | approx. 110 mm²/s | | | 1.004 mm²/s |
| at 23° C. | | approx. 507 mm²/s | approx. 1274 mm²/s | |
| at 37° C. | | approx. 205 mm²/s | approx. 459 mm²/s | |
| Density at 20° C. | approx. 1.70 g/cm³ | approx. 1.70 g/cm³ | approx. 1.70 g/cm³ | approx. 0.998 g/cm³ |
| Surface tension (20° C.) against air | approx. 23 mN/m | approx. 23 mN/m | approx. 23 mN/m | approx. 72.75 mN/m |
| (Mean) molecular weight | approx. 1500 g/mol | approx. 1500 g/mol | approx. 1500 g/mol | 18 g/mol |

The invention claimed is:

1. An immersion liquid for water-immersion microscopy, having a refractive index of water, when measured at a temperature of 23° C. and a light wavelength of 546.1 nm, having a kinematic viscosity of greater than 20 mm²/s measured at a temperature of 20° C., and having a transmission of more than 70% at a layer thickness of 10 mm at wavelengths in the range between 350 nm and 850 nm, and said immersion liquid comprising a mixture of at least two different functional perfluoropolyethers, at least one of said two different functional perfluoropolyethers being selected from the group consisting of

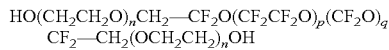
$$HO(CH_2CH_2O)_nCH_2—CF_2O(CF_2CF_2O)_p(CF_2O)_q$$
$$CF_2—CH_2(OCH_2CH_2)_nOH$$

and

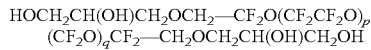
$$HOCH_2CH(OH)CH_2OCH_2—CF_2O(CF_2CF_2O)_p$$
$$(CF_2O)_qCF_2—CH_2OCH_2CH(OH)CH_2OH$$

wherein n is in each case in the range from 1 to 3, and p and q are in each case in the range from 3 to 12.

2. The immersion liquid of claim 1, having a kinematic viscosity of greater than 50 mm²/s.

3. The immersion liquid of claim 1, having a kinematic viscosity of greater than 150 mm²/s.

4. The immersion liquid of claim 1, having a kinematic viscosity in the range from 20 mm²/s to 1500 mm2/s.

5. The immersion liquid of claim 4, having a kinematic viscosity in the range from 200 mm²/s to 800 mm²/s.

6. The immersion liquid of claim 1, having the refractive index of water at temperatures elevated above room temperature.

7. The immersion liquid of claim 6, having the refractive index of water at 37° C.

8. The immersion liquid of claim 1, having a transmission value of more than 70% at a layer thickness of d =10 mm at wavelengths of greater than 350 nm.

9. The immersion liquid of claim 1, having a transmission value of more than 96% at a layer thickness of d =1 mm at wavelengths of greater than 350 nm.

10. The immersion liquid of claim 1, having a vapour pressure at 20° C. of less than 0.01 kPa.

11. The immersion liquid of claim 10, having a vapour pressure at 20° C. of less than 0.001 kPa.

12. The immersion liquid of claim 1, wherein at least one of the other different functional perfluoropolyether has functional groups selected from the group consisting of: alcohol; polyglycols, in particular possessing ethylene glycol and/or propylene glycol structures; alkyls; alkyl alcohols; alkyl olefins; alkyl esters; alkyl methacrylates; methyl esters; acetyl esters; alkylamides; alkyl sulphates; alkyl phosphates; alkyl carboxylates; isocyanate and derivatives thereof; and functional silanes.

13. The immersion liquid of claim 12, wherein said other different functional perfluoropolyethers has the general formula (I):

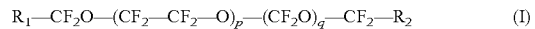
$$R_1—CF_2O—(CF_2—CF_2—O)_p—(CF_2O)_q—CF_2—R_2 \quad (I)$$

where $R_1$ and $R_2$ in each case represent the following
  $R_3O—CH_2—$, where $R_3$ =H or alkyl having from 1 to 3 carbon atoms
  $R_4—COO—$, where $R_4$ =alkyl having from 1 to 3 carbon atoms
  $R_5—O—CH_2CH(OH)—CH_2—O—CH_2-$, where $R_5$ =H or alkyl having from 1 to 3 carbon atoms or $R_4—CO—$,
  $R_3—O—(CH_2CH_2O)_n—CH_2—$, where n is in the range from 1 to 3,
and p and q are in each case in the range from 3 to 12.

14. The immersion liquid of claim 1, wherein the content of said at least one functional perfluoropolyether amounts to at least 90% by weight of said immersion liquid.

* * * * *